May 12, 1959     D. F. ALTIMIER ET AL     2,886,418
JOURNAL LINER FOR ROTARY KILN
Filed Jan. 6, 1955

INVENTORS
David F. Altimier And
Cecil J. Doubt
BY

AGENT

2,886,418
Patented May 12, 1959

2,886,418
JOURNAL LINER FOR ROTARY KILN

David F. Altimier, Niagara Falls, N.Y., and Cecil J. Doubt, Woodbury, N.J., assignors to E. I. du Pont de Nemours & Company, Wilmington, Del., a corporation of Delaware Application January 6, 1955, Serial No. 480,238

8 Claims. (Cl. 23—279)

This invention relates to a journal liner for a journal in a rotary kiln particularly for use in the production of a metal oxide such as sodium oxide from the elements.

The conversion of an alkali metal to its oxide usually takes place in a rotary kiln or burner into which the metal is charged so as to be distributed in molten form over a relatively large amount of alkali oxide. The dispersed or distributed metal is contacted with a dry atmosphere containing oxygen and free from any other reactive components. The gas, usually purified air, is fed into the rotating kiln counter to the flow of the metal oxide produced therein. The spent air or off-gas is removed at the charge end at which the metal is fed into the kiln while make-up air is fed into the kiln at the product discharge end.

Due to mechanical abrasion as the burden in the alkali metal burner is rotated and for other reasons there is a pronounced tendency to the formation of fine metal oxide particles. This fine powder is easily swept along by the off-gases and results in frequent plugging of the gas exit thereby increasing operating pressure within the kiln which limits the air feed rate and hence prevents high production rates.

It is, therefore, an object of the persent invention to provide an improved journal design for separating the dust from the off-gases in the alkali metal rotary burner and to decrease or eliminate plugging of the journal. Another object is to decrease the relative amount of fines produced in the burner. A further object is the production of a larger proportion of alkali metal oxide of a more suitable particle size for further handling. It is also an object to increase the production capacity of the burner and to decrease costs due to excessive maintenance and downtime for repairs.

These and other objectives are achieved by providing an off-gas stationary journal liner for the alkali metal burner. The journal liner is a tubular structure and is provided with a cutting edge helically shaped in the portion of the liner extending into the journal and adapted to keep the journal clean of materials that are carried along by the off-gases and that tend to settle in the journal. The helical cutting or scraping edge functions as a means for removing the material plugging the journal. As the journal turns with rotation of the burner the adhering solid material is removed and gradually worked back into the main burner where it becomes part of the reaction burden.

The figures illustrate one application of the invention specifically as applied to the conversion of sodium to sodium oxide.

Figure 1:
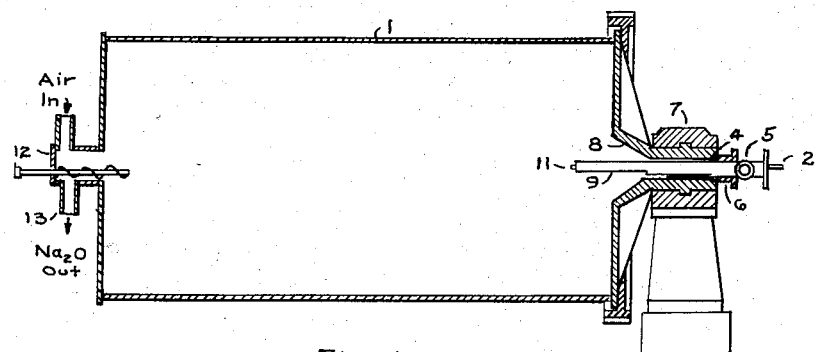
Figure 1 is a general assembly of the burner in cross-section.
Figure 2:
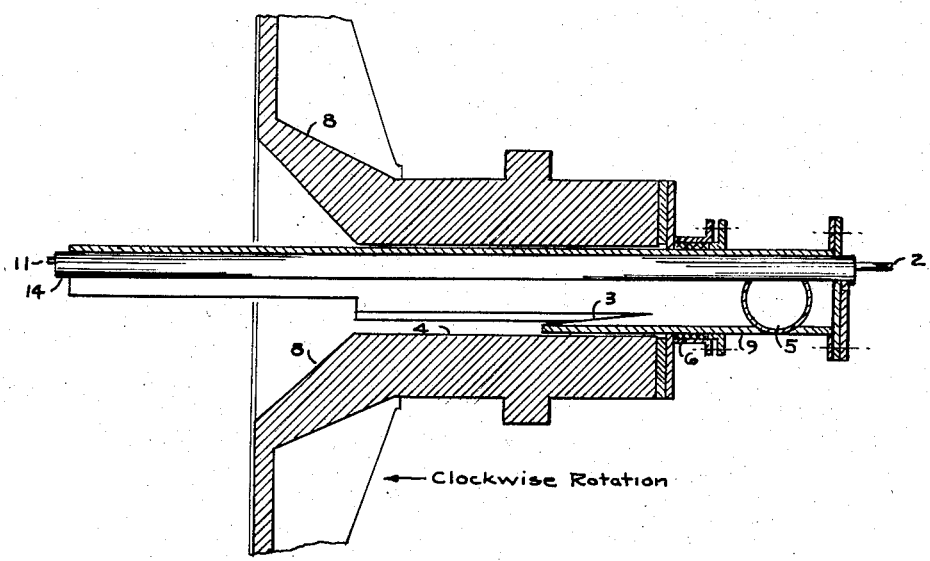
Figure 2 is a cross-section of the journal and sodium feed end of the burner.
Figure 3:
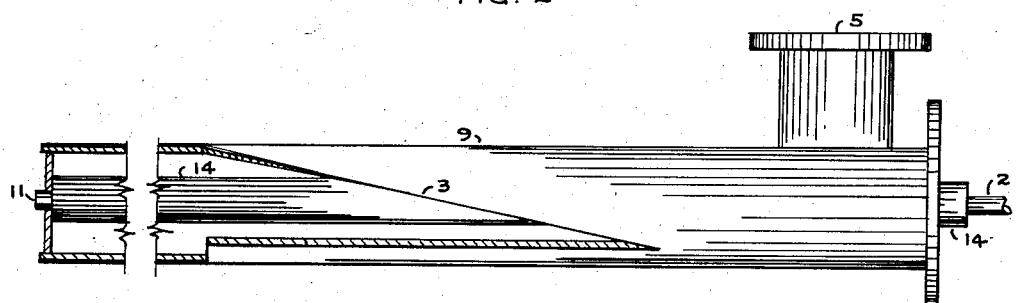
Figure 3 shows the journal liner turned 90°, part in cross-section.

The oxidation of the alkali metal takes place in a burner or kiln 1 capable of rotation on its horizontal axis in the direction shown by the arrow in Figure 2. The burner is provided with a hollow journal 4 integrally attached to the burner at 8 so that the journal rotates with the drum supported on a thrust bearing 7 and is sealed by packing gland 6. Journal liner 9 of tubular structure is of a size to slide into the hollow journal 4 and has in the section fitting into the journal a section cut away to leave a helically shaped cutting or scraping edge 3. The scraping edge must be located in the bottom of the liner and opposed to the rotation of the journal. Through the hollow journal liner there passes a feed pipe 2 for delivering alkali metal into the burner with exit as at 11. This feed pipe is provided with a suitable heating means 14, such as an electric heating coil to keep the alkali metal molten during delivery to the burner. The feed pipe may be insulated over a part or over all of its length as circumstances demand.

Fresh oxygen supply or air is fed into the burner at the opposite end from the off-gas journal through a trap device 12 not shown in detail. Through this device alkali metal oxide is also withdrawn as at 13 at a rate related to the rate of production.

The off-gas, such as nitrogen, from the burner leaves after passage through the journal liner 9 at exit 5.

The journal liner 9 remains stationary while the burner rotates on its axis. The off-gas leaving through the liner carries some pulverulent material into the journal and this often adheres strongly to the journal wall, eventually resulting in a plug which prevents the exit of the spent or off-gases. The edge 3, preferably made of a hard metal such as Stellite, will scrap off the deposited material, such as metal oxide, and cause it gradually to move forward into the burner by reason of the helical cut.

In operation in the special case of oxidizing sodium to sodium monoxide in a commercial scale burner, the off-gas journal tended to plug so frequently that the operation had to be interrupted fifteen and more times during a week's operation. The use of a stationary liner in the journal provided with a helical scraping edge as described reduced the plugging tendency to such an extent that the operation was interrupted at most only once a week. Additionally, the type of plug formed within the journal liner was much softer and more easily removed than the plugs that formed in the unlined journal. This difference can probably be attributed to the fact that the scraper edge of the journal liner continuously loosens the deposited material and keeps it in loose form and gradually works it back into the burner.

Preferably, the journal liner is cut away to one-half or less of its tubular structure on the end extending into the burner. The liner serves as a support for the alkali metal feed pipe. To obtain good results it is necessary to feed the alkali metal into the burner at some distance beyond the feed end. Preferably, the end of the alkali metal feed pipe extends into the burner to a distance between about 20% and 80% of the radius of said burner. In the case of a rotating burner or kiln having a length equal to four or more times that of the radius the feed pipe should discharge at a point at a distance from the feed end of at least 5% of its axial length. In general, it is desirable that the alkali metal introduced into the kiln is not sprayed onto the inner walls of the burner, particularly not on the end wall for best results.

This invention, particularly the stationary journal liner, is specifically adapted to the oxidation of sodium monoxide but may also have untility generally where a material is reacted in a rotary horizontal kiln and difficulty arises in the plugging of the off-gas journal.

We claim:

1. In a rotary horizontal kiln a hollow journal axially disposed at one end of said kiln to support said kiln, a stationary liner for said journal, said liner having a helical cutting edge adapted to scrape solid particles from the interior surface of said journal back into the main portion of said kiln.

2. In a cylindrical vessel for conducting the reaction between a liquid dispersed on a solid reaction product and a gas and adapted to be rotated on its horizontal axis a journal arrangement provided with a hollow shaft in one end of said vessel comprising a stationary journal liner extending axially into said vessel through the hollow shaft of the journal, said liner being provided with a helically shaped scraping edge over the section common to said journal, said scraping edge being adapted to scrape solid particles from the interior surface of said journal back into the main portion of said vessel, a feed pipe horizontally disposed in said liner and adapted to deliver liquid into the interior of said vessel at a distance of at least 5% of the distance from the charge end of said vessel to the discharge end of the same and a means for the withdrawal of spent reaction gas through said journal liner.

3. In a cylindrical vessel for conducting the reaction between sodium dispersed on a solid reaction product and a gas and adapted to be rotated on its horizontal axis a journal arrangement in one end of said vessel comprising a stationary journal liner extending axially into said vessel, said liner being provided with a helically shaped scraping edge adapted to scrape solid particles from the interior surface of the journal back into the main portion of said vessel, a feed pipe horizontally disposed in said liner and adapted to deliver liquid sodium into the interior of said vessel at a distance from the charge end of said vessel equal to at least about 20% of the radius of said vessel and a means for the withdrawal of spent reaction gas through said journal liner.

4. In a cylindrical vessel for conducting the reaction between sodium dispersed on sodium oxide and dilute oxygent and adapted to rotate on its horizontal axis a journal arrangement in the charge end of said vessel comprising a stationary journal liner extending axially into said vessel, said liner being provided with a helically shaped scraping edge adapted to scrap solid particles from the interior surface of the journal back into the main portion of said vessel, a sodium feed pipe horizontally disposed in said liner and adapted to deliver liquid sodium into the interior of said vessel and a means for withdrawing spent gas through said journal liner.

5. In a cylindrical vessel for reacting alkali metal with oxygen and adapted to rotate on its axis the journal combination comprising a hollow journal axially attached to one end of said vessel, a journal liner adapted to slide into said journal, said liner having a segment cut therefrom so as to provide a helically shaped scraping edge extending over the length said liner engages said journal, said scraping edge being adapted to scrape solid particles from the interior surface of the journal back into the main portion of said vessel, said liner being stationary and extending into said vessel, a feed pipe horizontally disposed in said liner and adapted to discharge alkali metal into the interior of said vessel at a distance from the end thereof, and means for removing spent reaction gas through said journal liner.

6. A journal liner for a rotary kiln comprising a rotating hollow journal axially disposed at one end of said kiln to support said kiln, a stationary liner for said journal, said liner having a helical cutting edge adapted to scrape deposited material from the interior surface of said journal back into the main portion of said kiln, and means for feeding liquid through said journal into said kiln, said feeding means being adapted to deposit said liquid at a distance from the charge end of said kiln equal to at least 20% of the radius of said kiln.

7. A journal liner for a horizontal rotary kiln comprising a rotating hollow journal axially disposed at one end of said kiln to support said kiln, a stationary liner for said journal, said liner having a helical cutting edge adapted to scrape deposited material from the interior surface of said journal back into the main portion of said kiln, means for feeding liquid through said journal into said kiln, said feeding means being adapted to deposit said liquid at a distance from the charge end of said kiln equal to at least 20% of the radius of said kiln, and means for removing spent gases from the kiln through said hollow journal out of contact with said liquid feed.

8. In a cylindrical vessel for conducting the reaction between a liquid dispersed on a solid reaction product and a gas and adapted to be rotated on its horizontal axis a journal arrangement provided with a hollow shaft in one end of said vessel comprising a stationary journal liner extending axially into said vessel through the hollow shaft of the journal, said liner being provided with a helically shaped scraping edge over the section common to said journal, said scraping edge being adapted to scrap solid particles from the interior surface of said journal back into the main portion of said vessel.

References Cited in the file of this patent
UNITED STATES PATENTS

| | | |
|---|---|---|
| 386,664 | Solvay | July 24, 1888 |
| 1,191,804 | Lidholm | July 18, 1916 |
| 1,685,520 | Carveth | Sept. 25, 1928 |
| 1,994,718 | Lellep | Mar. 19, 1935 |
| 2,521,190 | Stafford et al. | Sept. 5, 1950 |
| 2,630,310 | Harshberger | Mar. 3, 1953 |